INVENTORS.
SAMUEL STEINGISER
RICHARD J. PHILLIPS
ROBERT A. CASS

BY Morris L. Nielsen
ATTORNEY.

3,627,466
HEAT TREATMENT OF GRAPHITE FIBERS
Samuel Steingiser, Richard J. Phillips, and Robert A. Cass, Dayton, Ohio, assignors to Monsanto Research Corporation, St. Louis, Mo.
Filed May 28, 1970, Ser. No. 41,482
Int. Cl. C01b 31/07; C09c 1/46
U.S. Cl. 23—209.1
5 Claims

ABSTRACT OF THE DISCLOSURE

A process for improving the shear strength of a graphite fiber-resin matrix composite wherein the fibers are heat-treated in a controlled atmosphere containing ammonia at above 1000° C. prior to incorporation in the composite; such composites being useful as structural materials.

---

The invention herein described was made in the course of or under a contract or subcontract thereunder with the Department of the Air Force.

BACKGROUND OF THE INVENTION

This invention pertains to a process for modifying fibers and more particularly to heat-treating graphite fibers in a controlled atmosphere containing ammonia for the purpose of improving the shear strength of a graphite fiber-resin matrix composite.

Graphite fibers having high tensile strength, e.g. over 200,000 p.s.i., and high modulus, e.g. over $20 \times 10^6$ p.s.i., have recently become available in the market place. Composites made from such graphite fibers and resin matrices, including epoxy resins, phenolics, polyesters, polyimides, etc., are useful structural materials because of their high strength-to-weight ratio. However, such composites have generally not attained their anticipated potential because of deficiencies in interlaminated shear strength.

U.S. Pat. 3,179,605, issued Apr. 20, 1965 to Ohsol discloses a process for carbonizing regenerated cellulosic fibers in an ammonia atmosphere. U.S. Pat. 3,479,150, issued Nov. 18, 1969 to Gutzeit discloses a process for carbonizing cellulosic fibers in ammonia. Neither patent teaches improving shear strength in a composite.

We have found that improved composite shear strengths can be obtained by our process.

SUMMARY OF THE INVENTION

An object of this invention is to provide a continuous process for modifying the surface of graphite fibers. Another object is to provide a process for improving the bonding between graphite fibers and a resin matrix. A further object is to provide a process for improving the shear strength of composites containing graphite fibers and a resin matrix. Still a further object is to provide a composition incorporating heat-treated non-pitted graphite fibers as a reinforcement.

These and other objects hereinafter defined are met by the invention wherein there is provided a process of treating a high modulus graphite fiber to improve the bonding characteristics of said fiber to a resin matrix comprising heating said fiber in a controlled atmosphere containing ammonia at a temperature of above 1000° C. for a time sufficient to improve the shear strength of a graphite fiber-resin matrix composite over the shear strength of a control composite made with untreated graphite fibers.

The invention is adaptable and applicable to graphite fibers not only in the form of tow but also in yarns, tapes, felts, sheets, woven fabrics and other forms prepared from or containing graphite fibers. Although the term "graphite" is used, the fibers need not be highly crystalline as determined by X-ray diffraction analysis.

The invention may be practiced as a batch operation, but for a full-scale industrial process it is preferably done continuously. Yarns provide an especially convenient form for a continuous process. By employing a continuous process, production output is increased greatly and product quality and uniformity is improved. Our product is free of pitting, as shown by scanning electron micrography, and has a minimum loss in tensile strength.

Accroding to the invention, the graphite fibers are heated at temperatures of above 1000° C. in a controlled atmosphere containing ammonia. The heating means may be by any conventional source of heat including: combustion of hydrocarbons or oxidizable gases or liquids; radiant heating, e.g. from electrically heated resistance wires or bars; inductive heating, e.g. by direct coupling of radiofrequency energy to the heated work object or indirectly by radiation from a susceptor; microwave or dielectric heating; arc plasma; laser or maser heating; etc. We have found, for the purposes of this invention, that the preferred method of heating graphite fibers and yarn is by passing an electric current through the material thereby providing heat from the natural resistance of the material to the flow of electricity. This method of heating is preferred not only for its convenience, speed and efficiency but also because it yields a superior product by its reproducibility and ease of control.

The controlled atmosphere may consist of a mixture of ammonia and a non-oxidizing gas such as nitrogen, argon, hydrogen, or helium. The ammonia content may range from 1% to 100% by volume. The preferred range is 10% to 100% by volume of ammonia. As the ammonia content is increased, at a given temperature above 1000° C. and for a given dwell time, the shear strength of the resulting composite is generally increased. However, there may also occur a decrease in the fiber strength and in the tensile strength of the composites. For optimum shear strength, there exists an interrelationship between the ammonia content of the atmosphere, the dwell time and the fiber temperature. As the temperature and the ammonia content are increased, the sojourn or dwell time is decreased. Within the range of about 1050° to 1400° C. and about 10% to 100% of ammonia, we have found that the preferred dwell time will generally be within the range of about 1 to 60 seconds. The dwell time for obtaining shear strength improvement is readily determined by experimentation as hereinafter set forth. Furthermore, the oxidizing and heat-treating conditions, as to ammonia-content, fiber temperature and dwell time, are preferably optimized in view of both shear and tensile strength.

For purposes of process control, e.g. in determining the dwell time, the improvement in bonding between the graphite fiber surface and a matrix resin is determined by an interlaminar shear test of a composite. The treated graphite fibers in yarn form are formed into a filament-wound composite with a suitable resin such as an epoxy. The composite is cured, and tested specimens are cut to a suitable size and shape, e.g. 0.08 in. x 0.13 in. x 0.52 in.

Shear strength is determined by the short beam shear test ASTM D 2344-67-T (modified). The span/depth can be set at 3/1, 4/1 or 6/1 but is preferably 4/1. A discussion of the test and the effect of span/depth is published by Steingiser, Samuel and Cass, Robert A., "Graphite Fiber Reinforced Composites," AFML-TR-68-357, Part I, November 1968, pages 84, 96-107.

The graphite yarn-resin composites are conveniently prepared by impregnating and winding the yarn into a glass mold such as depicted at 12 in FIG. 1. This consists basically of three pieces of glass, an inner rectangular form and two outer end pieces, held together by clamps. As the assembly is rotated in its plane, the filament winding is confined between the end pieces and assumes the thickness and shape of the inner form, e.g. 0.070 in. in thickness. A width of about 0.10 in. is obtained by winding 70 turns of yarn. After the composite is wound, it is freed of excess resin and cured.

The heat-treated fibers of this invention are useful for reinforcing resin matrix composites. Typical resins used in conjunction with graphite fibers are epoxies, polyesters, polyimides, phenolics, and furane resins. The composites are high-strength structural materials useful in aircraft components.

BRIEF DESCRIPTION OF THE DRAWINGS

Some of the novel features of the present invention will become apparent from the following description which is to be considered in connection with the accompanying drawings.

In FIG. 1 there is shown an electrical heating means followed by resin-impregnating and composite-forming. The graphite yarn 1 is unwound from supply reel 2 which is turned by an unreeling motor controlled by "dancer" 3. The dancer consists of a pulley which floats on the graphite yarn and operates a microswitch. As downstream tension develops on the yarn, the dancer moves upward and starts the unreeling motor to supply more yarn and thereby maintain a predetermined tension, e.g. 10-100 grams. The yarn passes consecutively over pulleys 3, 4, 8 and 11, and finally is wound on form 12. Between pulleys 4 and 8 are two electro-conducting rotating electrodes 6 and 7 which contact the yarn and provide a means of electrically heating it. Sufficient voltage is applied at the electrodes to bring the temperature of the yarn to a desired value, e.g. for "Thornel" 50 graphite yarn a current of 2.0 amperes gives a temperature of approximately 1050° C. In the embodiment of FIG. 1, the graphite yarn is heated in a controlled atmosphere containing ammonia within compartment 5 between contracts 6 and 7 and thereafter enters resin solution 9. The coated yarn then passes between rollers 10 and over pulley 11 to composite form 12. End pieces 13 confine the filament winding to the thickness of form 12, thereby forming composite 14.

In FIG. 2 there is shown a radiant heating means adjacent to the yarn and provision for winding the heat-treated yarn directly on a drum. Graphite yarn 21 is unwound from supply drum 22 controlled by "dancer" 23 and passes over pulleys 24 and 28. Between pulleys 24 and 28 are radiant heaters 25 and 26 as electrical heating means. Surrounding the heated yarn is compartment 27 provided with suitable ports by passage of the yarn and entry of the gases comprising the atmosphere. Pulley 28 may serve as a heat sink to cool the yarn before it is wound on drum 29.

DESCRIPTION OF THE PREFERRED EMBODIMENTS

The invention is further illustrated by, but not limited to, the following examples.

EXAMPLE

This example illustrates the heat-treating of graphite fibers in an atmosphere of ammonia.

Figure 1:
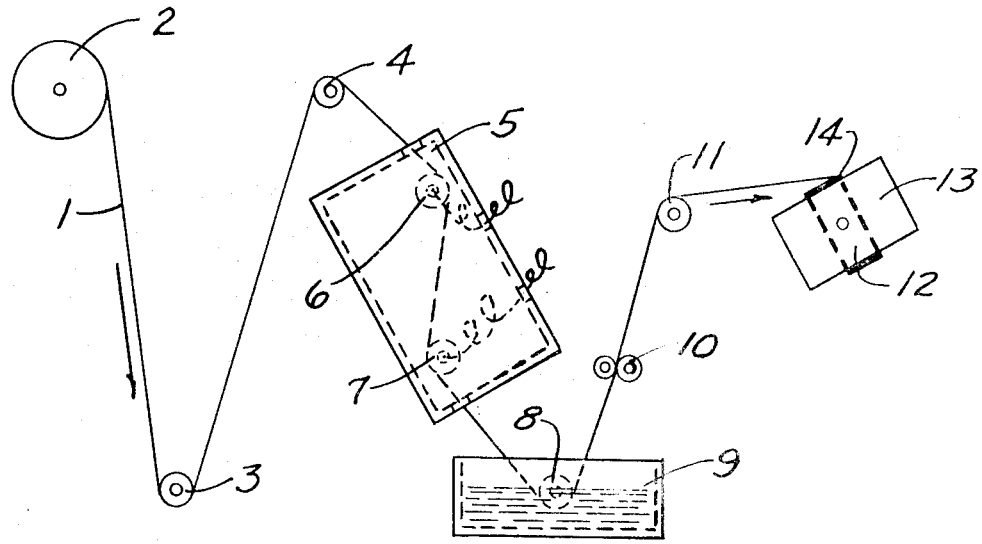
FIGS. 1 and 2 are representations of two embodiments of a continuous process for heating graphite yarn.
Figure 2:
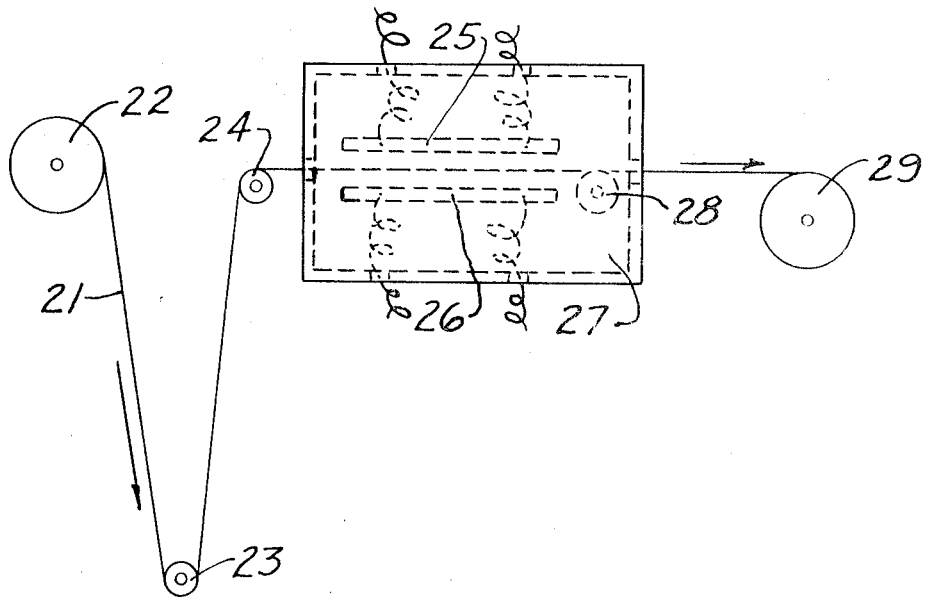

Graphite yarn was treated in a continuous operation using the process depicted in FIG. 1. Commercially available yarn was used, e.g. Union Carbide Corporation's "Thornel" 50 graphite yarn as described in their Technical Information Bulletin No. 465-203-GG.

Referring to FIG. 1, the yarn 1 passed over pulleys 3, 4, 8 and 11. Between pulleys 4 and 8 the yarn contacted against two graphite pulleys 6 and 7 connected by conductors to a source of electrical current. By control of the current the yarn was heated to a temperature of above 1100° C. (2010° F.). The rate of movement of the yarn was such that its dwell time at temperature was 35 seconds.

Inclosure 5 was fitted with inlet and outlet ports for the yarn and provided a controlled atmosphere for the yarn. Ammonia gas taken from a commercial cylinder entered the enclosure near its mid-region and was vented at the inlet and outlet ports.

At pulley 8 the yarn entered resin bath 9 and was thereby impregnated. For this example the resin was 100 parts by weight of (a) a mixture of a cycloaliphatic epoxide and a bisphenol-A based epoxide, e.g. Union Carbide's ERL-2256 described in their Products Standards dated Nov. 1, 1964 and 27 parts by weight of (b) a diamine hardener, specifically a eutectic of methylene dianiline and m-phenylenediamine, e.g. Union Carbide's ZZL-0820. The impregnated yarn passed over rollers 10 and pulley 11 and thence wound into a composite on form 12. In the simple embodiment depicted, a rectangular form 12 is held between two end pieces 13 which confine the filament winding to the thickness of form 11, resulting in composite 14, approximately 0.08 in. thick by 0.10 in. wide. It was cured 2 hours at 80° C., and 4 hours at 150° C. The shear strengths of the composites were determined by the A.S.T.M. "Proposed Tentative Method of Test for Apparent Horizontal Shear Strengths of Flat Laminates," Designation D-2344-67-T (revised). Specimens 0.08 in. x 0.13 in. x 0.52 in. in size were used at a span-to-depth ratio of 4/1. The results from four specimens were averaged. The composites contained about 50% fiber by volume. Results are shown in the following table.

SHEAR PROPERTIES OF COMPOSITES AS RELATED TO DWELL TIME IN AMMONIA ATMOSPHERE

| | Dwell time, sec. | Composite shear strength (SH), p.s.i. |
|---|---|---|
| Specimen: | | |
| A | 13 | 9,000 |
| B | 16 | 8,270 |
| C | 19 | 8,110 |
| D | 27 | 9,420 |
| E | 36 | 8,260 |

Control, without heat treatment, using as received yarn: $S_H = 6370$.

It is apparent that the shear strength of the fibers in the composite was improved by heat-treatment.

What we claim is:

1. A process of treating a high modulus graphite fiber to improve the bonding characteristics of said fiber to a resin matrix comprising heating said fiber in a controlled atmosphere containing amonia at a temperature of above 1000° C. for a time sufficient to improve the shear strength of a graphite fiber-resin matrix composite over the strength of a control composite made with untreated graphite fibers.

2. A process of claim 1 in which the controlled atmosphere contains ammonia in the range of 1% to 100% by volume of ammonia.

3. A process of claim 1 in which the temperature is in the range of about 1050° to 1400° C.

4. A process of claim 1 in which the time is in the range of about 1 second to 60 seconds.

2. process of claim 1 in which said fiber is in the form of a yarn and is moved continuously through the heated atmosphere containing ammonia during the process.

References Cited

UNITED STATES PATENTS

| 3,179,605 | 4/1965 | Ohsol | 23—209.1 X |
| 3,304,148 | 2/1967 | Gallagher | 23—209.1 X |
| 3,313,597 | 4/1967 | Cranch et al. | 23—209.3 |
| 3,431,362 | 3/1969 | Spry | 23—209.1 |
| 3,454,469 | 7/1969 | Lutzeit | 23—209.1 |
| 3,461,082 | 8/1969 | Wadsworth et al. | 260—37 |

EDWARD J. MEROS, Primary Examiner

U.S. Cl. X.R.

23—209.2, 209.3; 106—307; 260—37